(12) United States Patent
Thompson

(10) Patent No.: US 7,475,456 B2
(45) Date of Patent: Jan. 13, 2009

(54) CARABINERS HAVING A CAPTIVE EYE OPENING

(75) Inventor: Rocke P. Thompson, Bountiful, UT (US)

(73) Assignee: Techxotic LC, Clearfield, UT (US)

( * ) Notice: Subject to any disclaimer, the term of this patent is extended or adjusted under 35 U.S.C. 154(b) by 0 days.

(21) Appl. No.: 11/732,358

(22) Filed: Apr. 3, 2007

(65) Prior Publication Data
US 2007/0186393 A1 Aug. 16, 2007

Related U.S. Application Data

(62) Division of application No. 11/044,655, filed on Jan. 27, 2005, now Pat. No. 7,228,601.

(60) Provisional application No. 60/539,522, filed on Jan. 27, 2004.

(51) Int. Cl.
*F16B 45/02* (2006.01)
(52) U.S. Cl. .................. 24/599.9; 24/600.1; 24/601.1
(58) Field of Classification Search ............... 24/599.9, 24/600.2, 588.1, 598.2, 599.1, 601.3, 600.9, 24/599.4, 599.8; 294/82.19, 82.22
See application file for complete search history.

(56) References Cited

U.S. PATENT DOCUMENTS

| 29,029 | A | * | 7/1860 | Wynblad | 294/82.22 |
| 2,006,013 | A | * | 6/1935 | Claywell | 33/203.2 |
| 2,706,318 | A | * | 4/1955 | Coffing | 294/82.2 |
| 2,791,817 | A | * | 5/1957 | Burnham | 294/82.22 |
| 3,008,210 | A | * | 11/1961 | Stovern | 294/82.19 |
| 4,930,194 | A | | 6/1990 | Frechin | |
| 5,187,844 | A | | 2/1993 | Simond | |
| 5,357,657 | A | | 10/1994 | Petzl | |
| 5,384,943 | A | | 1/1995 | LeFebvre et al. | |
| 5,505,013 | A | * | 4/1996 | Gois | 43/14 |
| 5,577,304 | A | | 11/1996 | Simond | |
| 5,608,953 | A | * | 3/1997 | Petzl et al. | 24/588.1 |
| 5,664,304 | A | * | 9/1997 | Tambornino | 24/599.1 |
| 5,791,025 | A | | 8/1998 | Maurice et al. | |
| 5,913,479 | A | * | 6/1999 | Westwood, III | 24/298 |
| 5,927,431 | A | * | 7/1999 | Klein, Jr. | 182/3 |
| 6,161,264 | A | * | 12/2000 | Choate | 24/599.5 |

(Continued)

FOREIGN PATENT DOCUMENTS

EP 0 376 860 B1 2/1992

(Continued)

OTHER PUBLICATIONS

Captive Eye, DMM Industrial Website, 1 page (no date).

(Continued)

*Primary Examiner*—Robert J Sandy
(74) *Attorney, Agent, or Firm*—TraskBritt

(57) ABSTRACT

Various embodiments for carabiners employing a pivoting gate and having a captive eye opening are disclosed. The carabiners of the present invention employ an arm laterally extending from the body of the carabiner to define a major opening and a captive eye opening within the interior of the carabiner. Some of the inventive carabiner designs provide the capability of opening the gate while the captive eye opening is maintained. Methods of fabrication and use of the carabiners are also disclosed.

19 Claims, 12 Drawing Sheets

U.S. PATENT DOCUMENTS

| | | | |
|---|---|---|---|
| 6,601,274 B2 * | 8/2003 | Gartsbeyn | 24/599.8 |
| 6,622,354 B1 | 9/2003 | Klingier | |
| 2002/0073520 A1 | 6/2002 | Hall | |
| 2003/0167608 A1 | 9/2003 | Petzl et al. | |

FOREIGN PATENT DOCUMENTS

| | | |
|---|---|---|
| EP | 0 976 936 A1 | 2/2000 |
| EP | 1 178 227 A1 | 6/2002 |
| EP | 1 229 258 A2 | 12/2002 |
| FR | 2 856 309 | 12/2004 |

OTHER PUBLICATIONS

Locking Carabiners, DMM Industrial Website, 1 page (no date).
Rescue Equipment, CMC Rescue XL Steel Carabiner, CMC Rescue Inc., 2003, 1 page, cmcrescue.com.
Abseil & Belay Equipment, DMM International, Jul. 2000, 2 pages.
DMM Belay Master Karabiners, DMM International, July, 11 pages.
PCT International Search Report for International Application No. PCT/US2005/003116 dated May 31, 2005 (4 pages).

* cited by examiner

CARABINERS HAVING A CAPTIVE EYE OPENING

CROSS-REFERENCE TO RELATED APPLICATIONS

This application is a divisional of application Ser. No. 11/044,655, filed Jan. 27, 2005, now U.S. Pat. No. 7,228,601, issued Jun. 12, 2007, which claims the benefit of U.S. Provisional Application Ser. No. 60/539,522 filed Jan. 27, 2004, the disclosure of each of which is incorporated in its entirety herein.

BACKGROUND OF THE INVENTION

1. Field of the Invention

The present invention relates to an improved carabiner. More particularly, the present invention relates to carabiners configured to prevent cross-loading thereof during use, and methods of fabricating such carabiners.

2. State of the Art

Carabiners are used for various applications in many different activities. Carabiners are typically associated with outdoor recreational activities, such as rock climbing, mountaineering, and mountain rescue work. However, carabiners are also employed in many other applications such as rescue work in urban and industrial settings, safety restraints in urban and industrial settings, law enforcement work, military applications.

Generally, a carabiner includes a ring or C-shaped body having a gate which may be opened to insert a rope, sling, or a belay/rappel device (e.g., a figure eight device or another belay/rappel device). The gate is shut, typically, by a spring which urges the gate closed. Often times, the gate may be further secured in a closed position by a locking mechanism which locks the gate to prevent unintended opening thereof.

Typically, a carabiner having an elongated shape, such as an oval or a D-shape, exhibits different load carrying capacities in different directions. FIG. 1 shows a carabiner 100 having a generally C-shaped body 102 and a gate 104 secured at one end region 110 of the C-shaped body 102. The gate 104 may be pivoted to open as shown in FIG. 1. The load carrying capacity of the carabiner 100 is greatest along its major axis 106, while exhibiting a reduced carrying capacity along its minor axis 108 (i.e., when cross-loaded). The carabiner 100 illustrated in FIG. 1 is depicted having a screw locking mechanism 112 that may be used to lock the gate 104 when closed.

The carabiner 100 may rotate during use, causing loading to occur primarily along its weaker, minor axis 108. Even worse, the gate 104 may be significantly loaded along the minor axis 108, causing the gate 104 to break and the carabiner 100 to fail. Many potentially unsafe scenarios may arise when using a traditional carabiner, if care is not taken. For instance, with reference to FIGS. 2 and 3, one potentially hazardous scenario is shown using the example of a climber rappelling with a figure eight device. Referring to FIG. 2, a climber wearing a climbing harness 114 having a waist belt 116 and leg loops 118 is illustrated. The leg loops 118 and the waist belt 116 are attached together with belay loop 119. The conventional locking carabiner 100 (shown in FIG. 1) having a figure eight device 122 attached thereto is attached to the belay loop 119. A rope 124 is threaded through the figure eight device 122 in a manner to enable a controlled rappel by the climber. The proper use of the figure eight device 122 is depicted in FIG. 2, wherein the carabiner 100 is loaded during rappelling primarily along its major axis 106. However, as shown in FIG. 3, the carabiner 100 may rotate in the belay loop 119 either during belaying or rappelling to cause the figure eight device 122 to not only load the carabiner 100 along its minor axis 108, but to have the figure eight device 122 bear directly against the screw locking mechanism 112 and the gate 104. The loading situations depicted in FIG. 3 may cause the screw locking mechanism 112, the gate 104, or both to break, potentially having catastrophic consequences for the climber if the rope is disconnected from the carabiner 100. At the very least, the carabiner 100 is oriented such that it is loaded along its weaker axis (i.e., the minor axis 108).

An attempt to prevent a conventional carabiner from being cross-loaded is disclosed in European Patent Application EP 0976936 assigned to DMM Engineering Limited of Great Britain. The carabiners disclosed in EP 0976936 are sold by DMM International and are called the DMM "Belay Master." The DMM Belay Master carabiner is illustrated in FIGS. 4A-4D. Referring to FIG. 4A, a carabiner 126 having a generally C-shaped body 128, a gate 130 with a locking mechanism 138, and a lateral support member 132 is shown. A spring mechanism (not shown) urges the gate 130 to rotate in direction 136 about pin 134 to close. The gate 130 is shown closed in FIG. 4B, wherein the locking mechanism 138 is moved upward in direction 140 and screwed in direction 142 to securely lock the locking mechanism 138. As shown in FIG. 4C, the lateral support member 132 is then rotated about a portion of the C-shaped body 128 and snapped over the gate 130 including the locking mechanism 138 to create a so-called "captive eye" opening 144 at the bottom of the carabiner 126 and an opening 150 at the top thereof.

The lateral support member 132 assists with preventing the carabiner 126 from rotating when it is secured to another object. FIG. 4D illustrates the captive eye opening 144 of carabiner 126 attached to a belay loop 146 of a climbing harness and a rope 148 threaded through the opening 150 of the carabiner 126 and a belay/rappel device 152. The lateral support member 132 prevents the carabiner 126 from rotating in the belay loop 146 to an orientation such that it may be cross-loaded along its minor axis. Furthermore, because the lateral support member 132 covers the gate 130, it is difficult for another object (e.g., another carabiner, figure eight device, etc.) to bear directly against the gate 130. While the lateral support member 132 of the DMM Belay Master carabiner reduces the ability of the carabiner to become cross-loaded during use, the gate 130 cannot be opened unless the lateral support member 132 is disengaged. If the user has to open the gate 130, he or she must disengage the lateral support member 132 and unscrew the locking mechanism 138. This takes valuable additional time for the user and eliminates the beneficial captive eye opening 144. Another disadvantage with the DMM Belay Master carabiner is the lateral support member 132 is formed from a weaker, plastic-type of material.

Another attempt to prevent cross-loading of a carabiner is disclosed in U.S. Patent Application Publication US2003/0167608 assigned to Zedel of Crolles, France (hereinafter "the '608 Application"). Referring to FIGS. 5A and 5B, the carabiner 154 disclosed in the '608 Application is shown. In FIG. 5A, the carabiner 154 is depicted having a generally C-shaped body 156 and a gate 158 that may pivot about pin 164. The locking mechanism 160 has a lateral support member 162 extending therefrom to bear against an opposing portion 174 of the C-shaped body 156. When the gate 158 is closed and the lateral support member 162 is engaged, a captive eye opening 172 is created at the bottom of the carabiner 154. Referring to FIG. 5B, in order to open the carabiner 154, the locking mechanism 160 must be released and rotated in direction 170. However, as with the DMM Belay Master (shown in FIGS. 4A-4D), in order to open the gate of the carabiner 154, the lateral support member 162 must be disengaged, thus, eliminating the captive eye opening 172. Furthermore, there is a potential danger that a climber may inadvertently sandwich the belay loop of a climbing harness between the body 156 of the carabiner 154 and the lateral support member 162, having potentially disastrous consequences.

Accordingly, there is a need for a carabiner having a captive eye opening and, optionally, wherein the gate of the carabiner may be opened without eliminating the captive eye opening.

BRIEF SUMMARY OF THE INVENTION

The present invention, in a number of embodiments, includes carabiners having a captive eye opening which prevents the carabiner from becoming cross-loaded during use. In addition, methods of making and using the carabiners are also disclosed.

In an exemplary embodiment, a carabiner is disclosed. The carabiner may have a generally C-shaped body including a first end region, a second end region, and an elongated section therebetween. A gate is mounted at the second end region and is pivotable between a closed position and an open position. The carabiner further includes an arm rotatable about the elongated section. The arm avoids interference with the gate in the open position when the arm is positioned to extend laterally from a portion of the elongated section to a location at least proximate the second end region of the generally C-shaped body.

In another exemplary embodiment, a carabiner is disclosed. The carabiner may have a generally C-shaped body having a first end region, a second end region, and an elongated section therebetween. A gate is mounted at the second end region and is pivotable between a closed position and an open position. The carabiner further includes an arm having a female structure that receives the elongated section and laterally extends from a portion of the elongated section to a location at least proximate the second end region. The arm and the generally C-shaped body define a major opening and a captive eye opening. The positioning of the arm avoids interference with the gate in its open position.

In another exemplary embodiment, a carabiner is disclosed. The carabiner may have a generally C-shaped body having a first end region, a second end region, and an elongated section therebetween. A gate is mounted at the second end region and is pivotable between a closed position and an open position. The carabiner further includes an arm rotatable about the elongated section between a first rotational position and at least a second rotational position. In the first rotational position, the arm extends laterally from the elongated section until a surface thereof lies at least proximate an interior portion of the gate opposing the elongated section.

In yet another exemplary embodiment, a carabiner is disclosed. The carabiner may have a generally C-shaped body having a first end region, a second end region, and an elongated section therebetween. A gate is mounted at the second end region and is pivotable between a closed position and an open position. The carabiner further includes a rotatable arm mounted at the second end region, wherein the arm is rotatable to be situated within the interior of the generally C-shaped body to define a top opening and a bottom opening with the generally C-shaped body.

These features, advantages, and alternative aspects of the present invention will be apparent to those skilled in the art from a consideration of the following detailed description taken in combination with the accompanying drawings.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
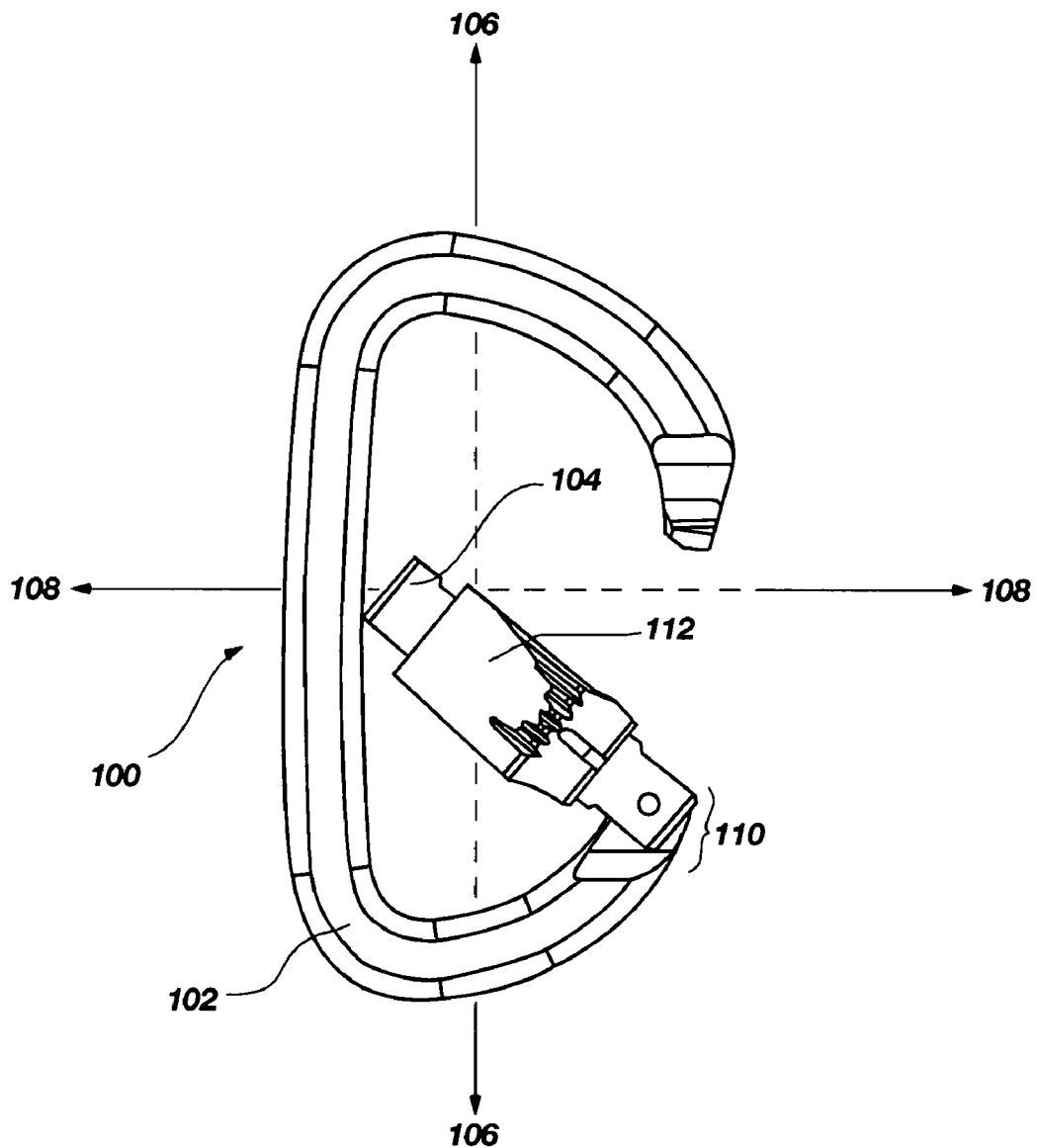
FIG. 1 illustrates a conventional locking carabiner.
Figure 2:
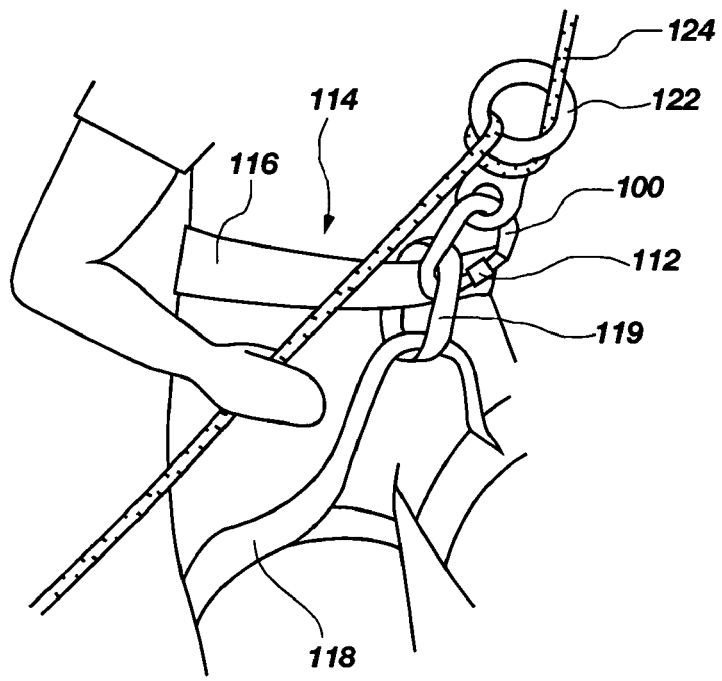
FIG. 2 illustrates a climber employing the carabiner of FIG. 1 for rappelling in conjunction with a figure eight device.
Figure 3:
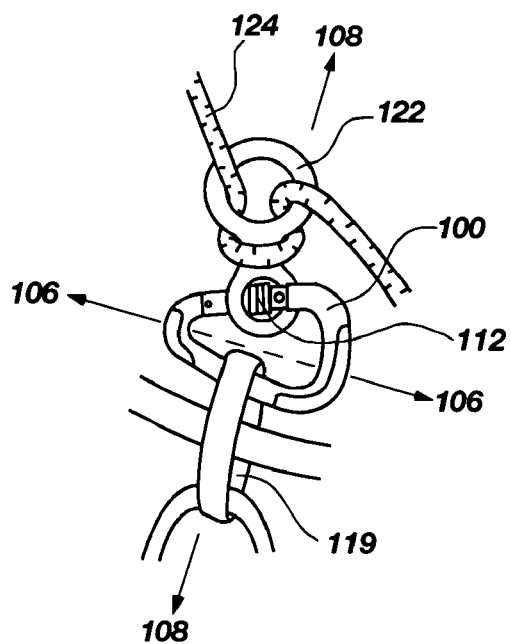
FIG. 3 illustrates a figure eight device cross-loading the carabiner of FIG. 1.
Figure 4A:
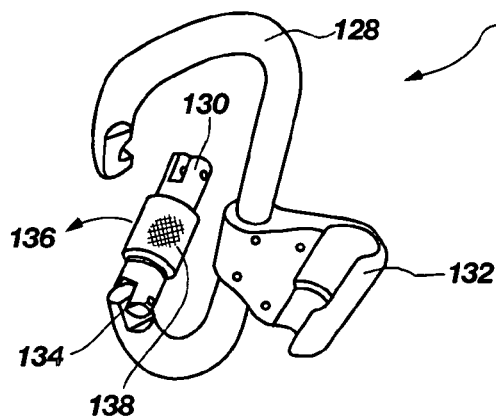
FIGS. 4A-4D illustrate the DMM Belay Master carabiner.
Figure 4B:
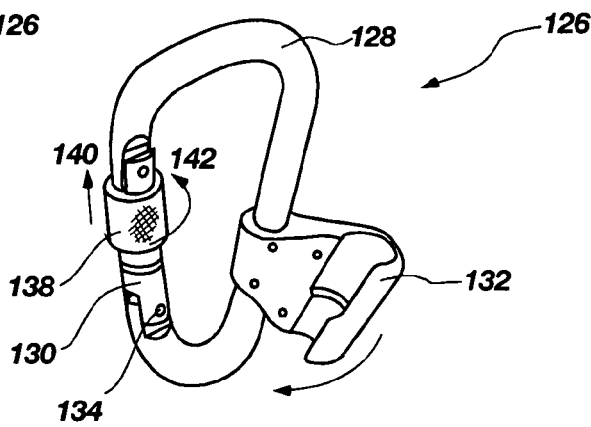
Figure 4C:
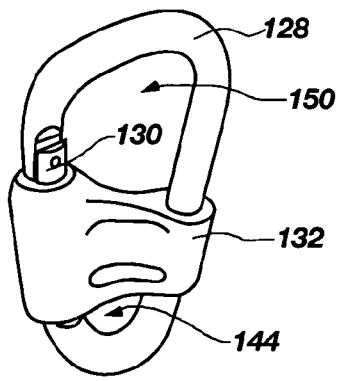
Figure 4D:
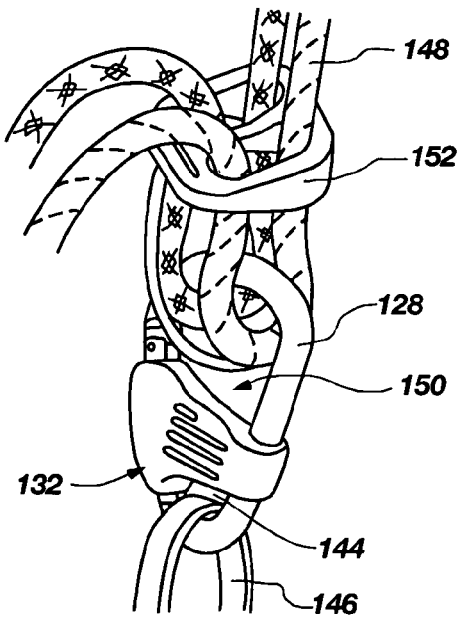
Figure 5A:
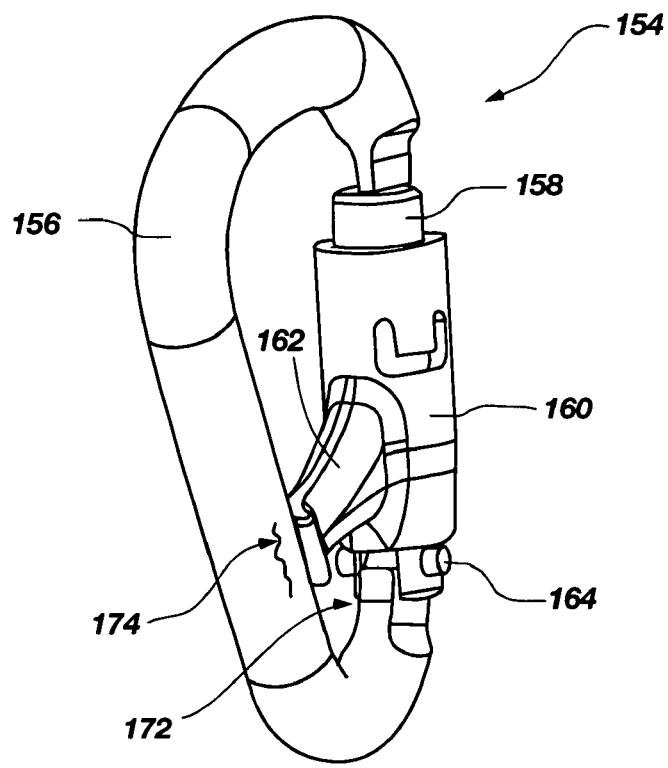
FIGS. 5A-5B illustrate another carabiner which employs a lateral support member extending from the gate locking mechanism.
Figure 5B:
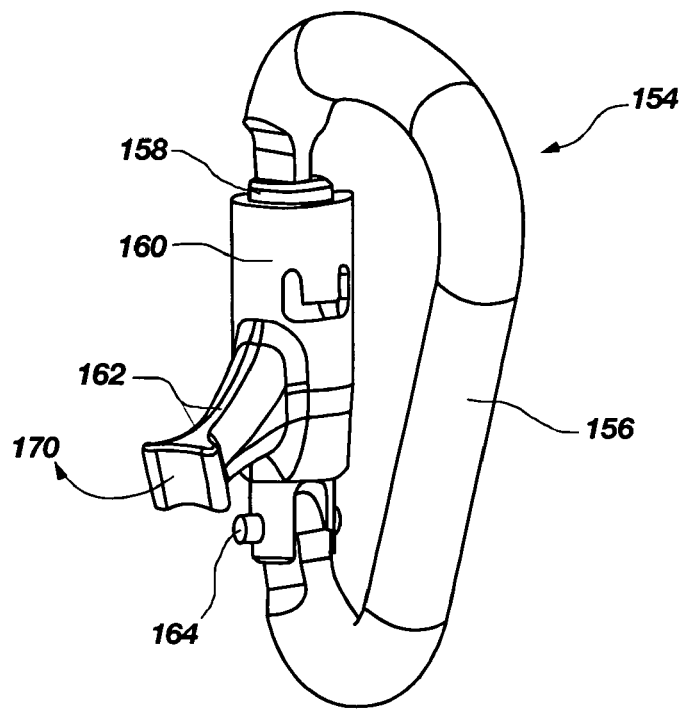

The present invention, in a number of embodiments, includes carabiners having a captive eye opening which prevents the carabiner from becoming cross-loaded during use. As known in the art, the body of the carabiners of the present invention may be formed from a variety of metals and alloys, such as aluminum alloys and steel. The body of the carabiners may be shaped by bending into the desired shape, followed by stamping or machining to impart a desired cross-section configuration, and heat treating, if necessary or desired, to increase the strength or alter other properties thereof. In the detailed description which follows, like features and elements in the several embodiments are identified in the drawings with the same or similar reference numerals for the convenience of the reader.

Figure 6A:
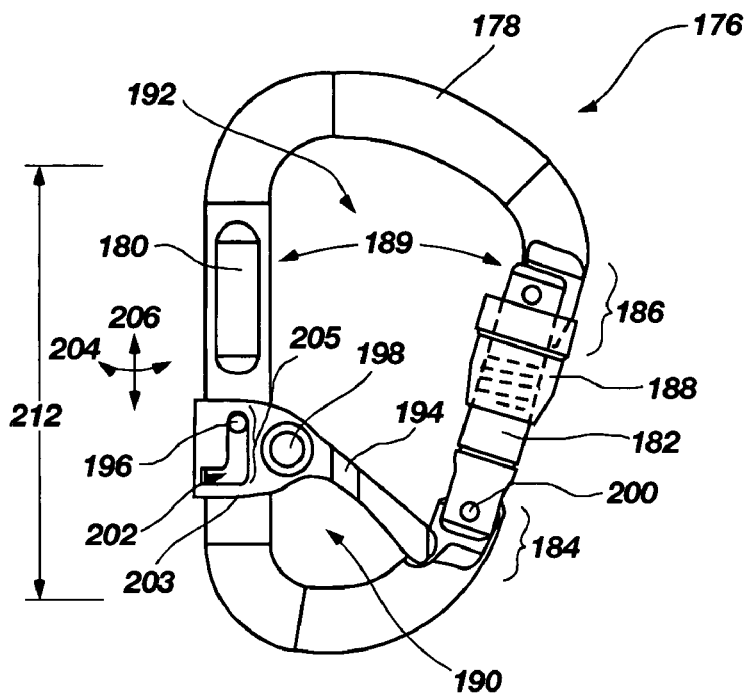
FIG. 6A illustrates an exemplary carabiner of the present invention depicted with its lateral support member and gate in its closed position.
Figure 6B:
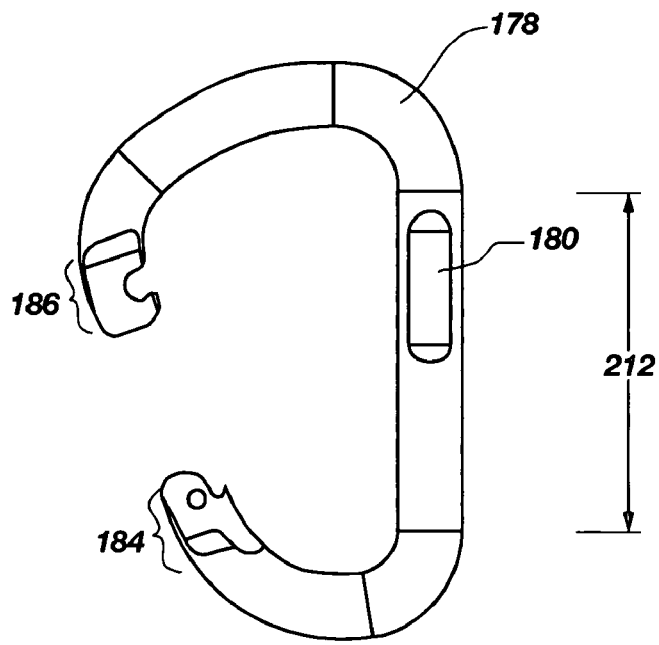
FIG. 6B illustrates the body of the carabiner of FIG. 6A without the lateral support member and the gate for clarity.

An exemplary embodiment of the present invention is depicted in FIGS. 6A-6H. A carabiner 176 having a generally C-shaped body 178, a gate 182 including a locking mechanism 188, and a lateral support member 194 is shown in FIG. 6A. The gate 182 is secured to end region 184 of the body 178 by a pin 200 (e.g., a rivet, screw, etc.). The gate 182 is rotatable about pin 200 to enable the gate 182 to open and close manually along the general arc 189. In the closed position depicted in FIG. 6A, a slot in the gate 182 receives an end region 186 of the body 178. Various configurations for the end regions 184 and 186 of the body 178 may be appreciated by one of ordinary skill in the art. One exemplary configuration for the end regions 184 and 186 is illustrated in FIG. 6B, where the body 178 is shown for clarity without the lateral support member 194 and the gate 182.

With continued reference to FIG. 6A, the locking mechanism 188 may comprise a screw locking mechanism which is secured to the gate 182 by threading thereon to fit snugly around the end region 186 encompassed by a portion of the gate 182. However, the locking mechanism 188 may also comprise a spring mechanism which urges the locking mechanism upwardly toward the end region 186 and which may be secured in place by a pin in the gate 182 being received by a slot in the locking mechanism 188. Other types of suitable locking mechanisms 188 may be used to lock the gate 182 to prevent inadvertent opening during use. A carabiner 176 without a locking mechanism 188 is within the scope of the present invention.

With continued reference to FIG. 6A, the lateral support member 194 has a generally C-shaped channel 208 (shown in FIGS. 6D and 6E) that is closely fitted around an elongated section 212 of the body 178. The lateral support member 194 may be formed from a material such as, for example, a machined aluminum alloy, a plastic (e.g., injection molded nylon), or a composite (e.g., injection molded fiber reinforced plastic). The lateral support member 194 is secured against the elongated section 212 by a manually operated detent mechanism 198 inserted into the hole 199 (shown in FIGS. 6D-6H), such as a button that releases a biasing mechanism that bears against the elongated section 212. Another suitable type of detent mechanism is described in more detail with respect to the biasing mechanism 220 illustrated in FIGS. 8A and 8B. In the embodiment of FIGS. 6A-6H, the lateral support member 194 extends laterally across the interior of the carabiner 176 to bear against the end region 184 just below the gate 182. When extended in its closed position, the lateral support member 194 divides the interior of the carabiner 176 into two sections: a captive eye opening 190 and a major opening 192. The major opening 192 may be accessed by the gate 182. While the captive eye opening 190 is shown as having a smaller size than the major opening 192, the two openings may be of about the same size, if desired. Furthermore, the gate 182 may still be opened to its full extent along the general arc 189 when the lateral support member 194 is in the closed position shown in FIG. 6A (i.e., the lateral support member 194 does not interfere with the opening of the gate 182).

The lateral support member 194 includes a female recess 210 (shown in FIGS. 6C-6G), which is sized and configured to mate with and engage a portion of the end region 184 (serving as the male member) to provide additional structural support to prevent the lateral support member 194 from inadvertently moving out of its closed position. The lateral support member 194 is movable in an axial direction 206 along the length of the elongated section 212 that it is fitted to and rotatable in a direction 204 about the elongated section 212. The extent of the allowable axial movement in axial direction 206 is restricted by the securing element 196 which is sized to fit in the L-shaped slot 202 of the lateral support member 194. The securing element 196 may be a pin, a screw, a rivet, etc., fixed to the elongated section 212 of the body 178.

Figure 6C:
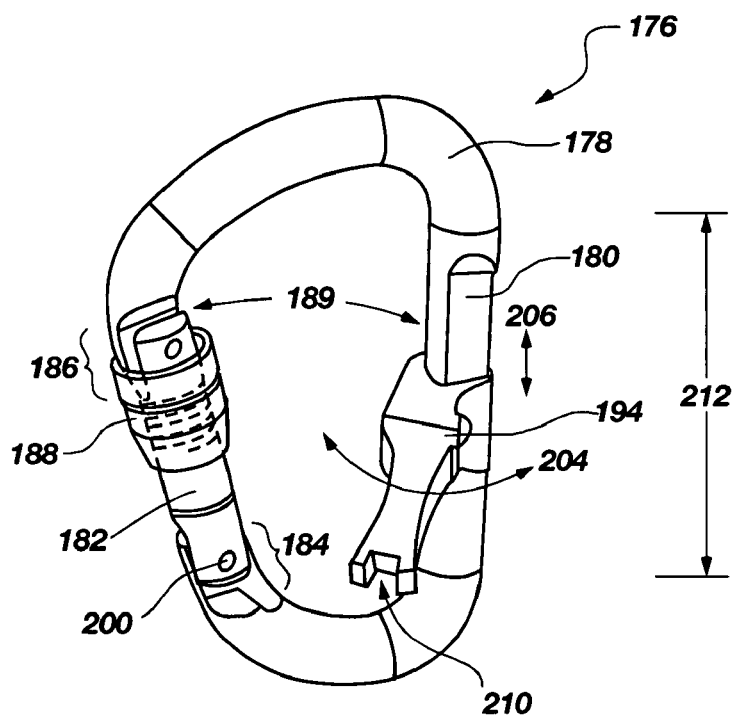
FIG. 6C illustrates the carabiner of FIG. 6A with the lateral support member rotated to an open position.

Referring to FIGS. 6A and 6C, the ability of the lateral support member 194 to rotate about the elongated section 212 is shown. The lateral support member 194 is urged upward in axial direction 206 along the elongated section 212 until the securing element 196 bears against base of lateral slot segment 203 of the L-shaped slot 202. The dimensions of the lateral support member 194 are such that when it is moved upward it does not interfere with the gate 182 in the closed position. The lateral support member 194 may then be rotated in the direction 204 within an arc provided by the lateral slot segment 203. The extent of the angular rotation about elongated section 212 is determined by length of lateral slot segment 203.

Figure 6D:
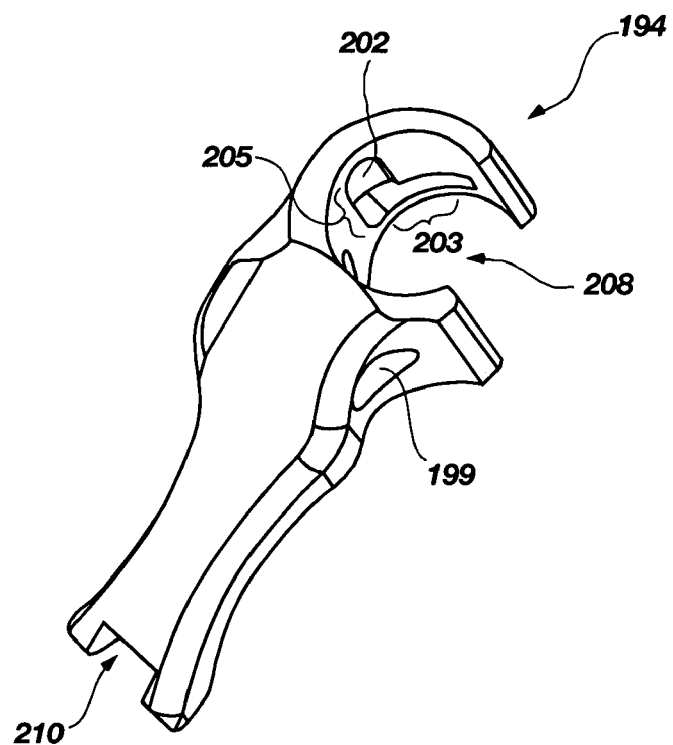
FIG. 6D illustrates the lateral support member having a generally C-shaped channel to be fitted on the body of the carabiner as shown in FIGS. 6A and 6C.

The lateral support member 194 is shown in more detail in FIG. 6D. The lateral support member 194 includes a generally C-shaped channel 208 that is sized to fit around the elongated section 212 of the body 178. The cross-section that defines the generally C-shaped channel 208 includes the L-shaped slot 202 comprised of the lateral slot segment 203 and the longitudinal slot segment 205 configured to receive the securing element 196 (shown in FIG. 6A). The opposing end of the lateral support member 194 includes the female recess 210 which mates with the end region 184 of the body 178. The female recess 210 is configured such that the end region 184, defining a male member, may be closely fitted within the female recess 210.

The exemplary carabiner 176 depicted in FIGS. 6A-6C enables having a captive eye opening 190 while still allowing the user to be able to open the gate 182 to its full extent. Thus, the carabiner 176 is well suited for use in belaying and rappelling. The belay loop of a climber's harness may simply be looped through the captive eye opening 190, while the rope and the belay/rappel device are looped through the major opening 192. The lateral support member 194 keeps the carabiner 176 oriented such that it is loaded predominately along its major axis during use. The carabiner 176 is also well suited for rescue situations. A pulley or other hauling device may be looped through the captive eye opening 190, while the major opening 192 is attached to an anchor such as, a tripod or a fixed anchor (e.g., bolts or other type of protection). Also, in some situations, the rope or sling may be looped through the captive eye opening 190 and, thus, cannot accidentally fall out. This is particularly useful when the user is clipping the carabiner 176 into an awkward or out-of-sight position such as, for example, clipping into the dorsal attachment on a fall protection harness. By employing the carabiner 176, it is difficult for it to rotate during use, reducing the chance of cross-loading and, thus, failure.

The lateral support member 194 may be installed on the body 178 by inserting the reduced cross-section portion 180 of the elongated section 212 into the generally C-shaped channel 208. The dimensions of the reduced cross-section portion 180 are such that it may be received by the generally C-shaped channel 208. Once the reduced cross-section portion 180 is received by the generally C-shaped channel 208, the lateral support member 194 is moved in the downward axial direction 206 to the thicker portion of the elongated section 212. The dimensions of the generally C-shaped channel 208 are such that the thicker portion of the elongated section 212 cannot be removed from the C-shaped channel 208 once the lateral support member 194 is installed. In the embodiment shown in FIG. 6D, the lateral support member 194 may only be removed by sliding it upward around the reduced cross-section portion 180. As shown in FIG. 6A, when the lateral support member 194 is in its secured position, the securing element 196 bears against the top portion of the longitudinal slot segment 205. Therefore, after the securing element 196 has been attached, the lateral support member 194 may not be uninstalled from the body 178 unless the securing element 196 has been detached.

Figure 6E:
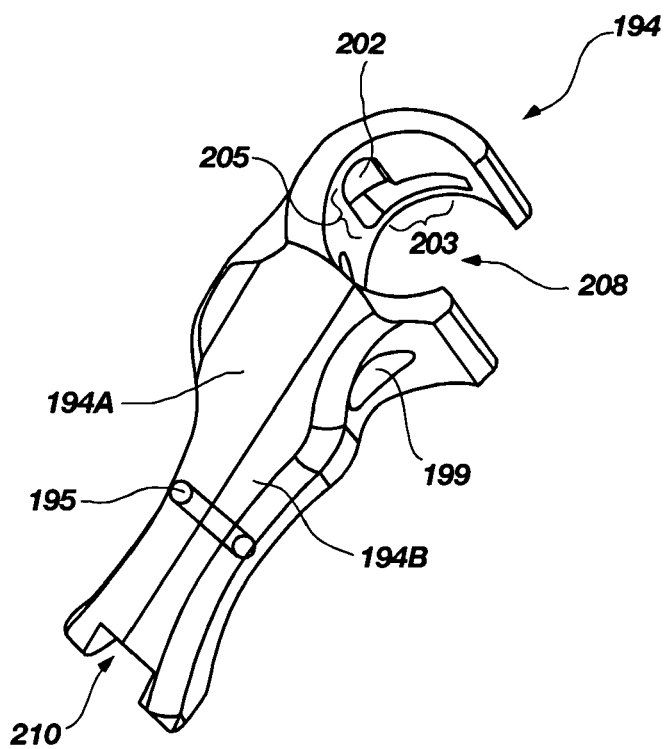
FIG. 6E illustrates a two piece lateral support member that may be assembled around the elongated section of the carabiner of FIG. 6B.

In another exemplary embodiment illustrated in FIG. 6E, the lateral support member 194 may be formed from two pieces, 194A and 194B, that may be assembled around the elongated section 212 of the carabiner 176 and fixed together using a connection element 195 such as, a screw, rivet, pin, etc. In another exemplary embodiment, the lateral support member may be installed on an elongated member, such as a rod, prior to bending the elongated member into the desired C-shape. The shaping of the elongated member may be performed by bending the rod around a die to obtain the desired C-shape.

Figure 6F:
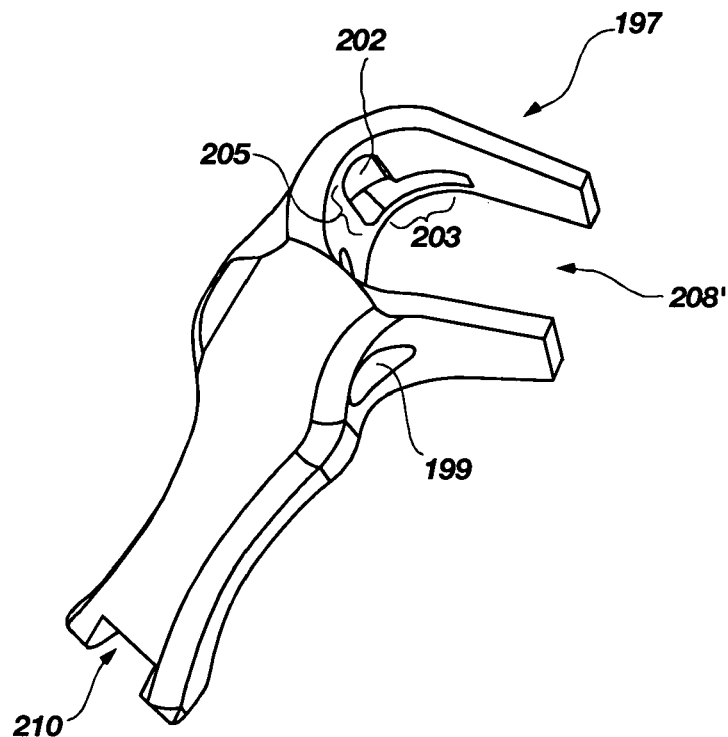
FIGS. 6F and 6G illustrate a lateral support member having a generally U-shaped channel to be fitted onto the body of the carabiner.
Figure 6G:
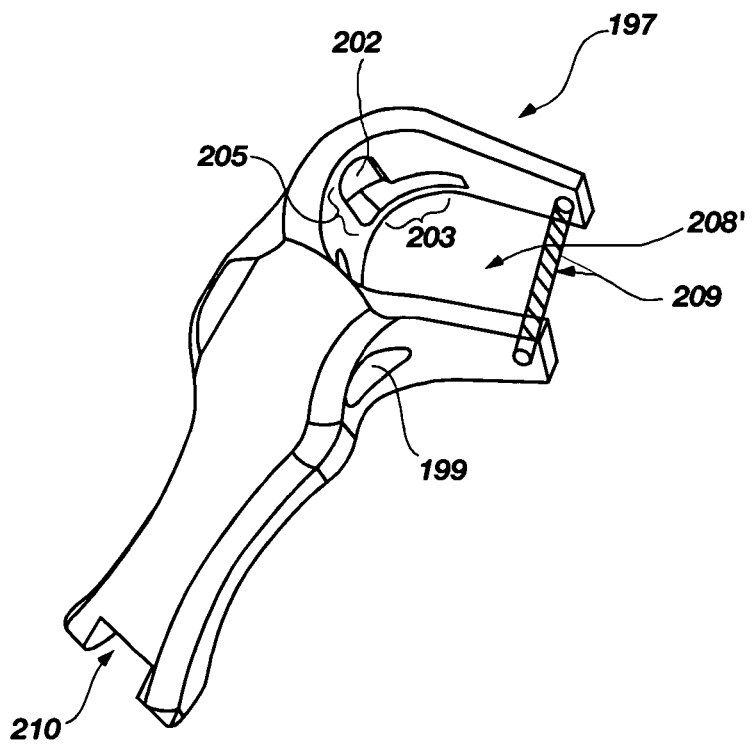

In another exemplary method of installing a lateral support member on the body of a carabiner illustrated in FIGS. 6F and 6G, a lateral support member 197 may have a generally U-shaped channel 208'. As shown in FIG. 6F, the dimensions of the U-shaped channel 208' are such that the elongated section 212 of the body 178 may be received by U-shaped channel 208'. The lateral support member 197 may be securely fastened to the elongated section 212 by bending the ears of the U-shaped channel 208' inward to form a generally C-shaped channel as with C-shaped channel 208 shown in FIG. 6D. Referring to FIG. 6G, the lateral support member 197 may also be securely fastened to the elongated section 212 by using a fastening element 209 such as, a pin, a screw, or a rivet, etc. that extends between the ears of the U-shaped channel 208'.

Figure 6H:
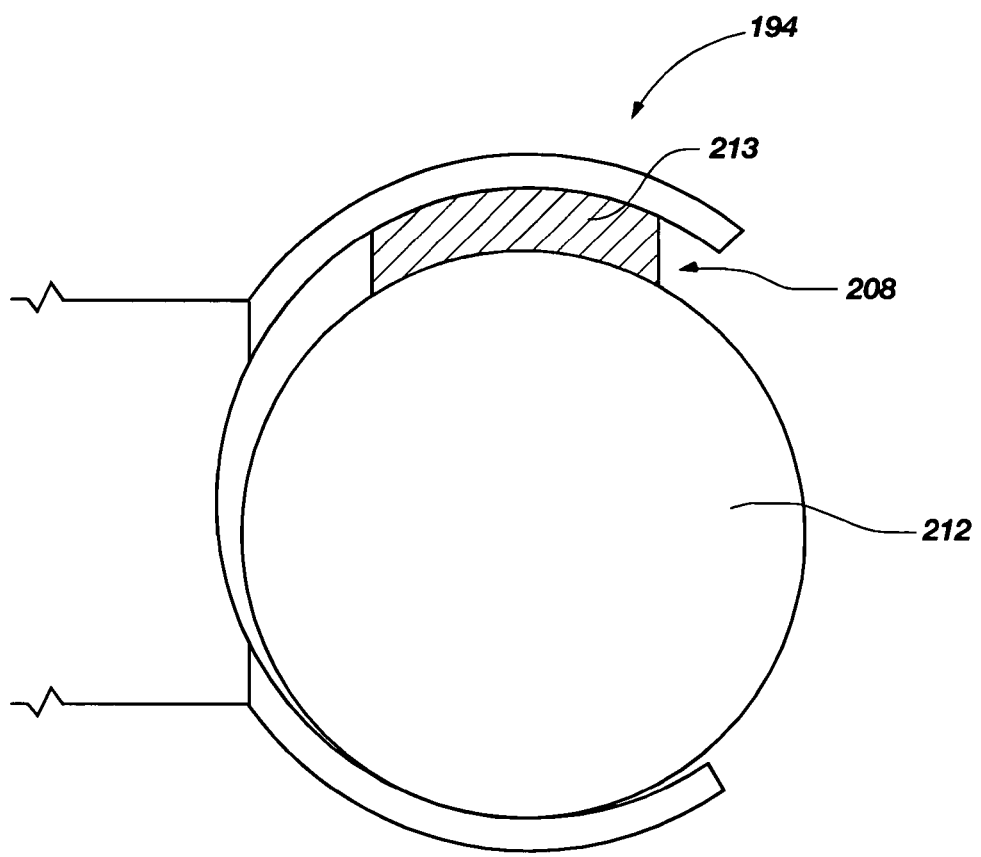
FIG. 6H illustrates a sectional view of the generally C-shaped channel of the lateral support member shown in FIG. 6D having a spacer between the channel and the elongated section of the carabiner to provide a close fit.

In yet another exemplary embodiment for installing the lateral support member 194 illustrated in FIG. 6H, the C-shaped channel 208, either being generally C-shaped or a full circle, may be dimensioned large enough to be able to be slipped over a fully formed body of a carabiner such as, the generally C-shaped body 178. As shown in the sectional view of FIG. 6H, when the elongated section 212 of the body 178 is inserted inside the C-shaped channel 208, a spacer, insert, or pin 213 may be placed between the C-shaped channel 208 and the elongated section 212 to take up the additional volume and provide a close fit.

Figure 7:
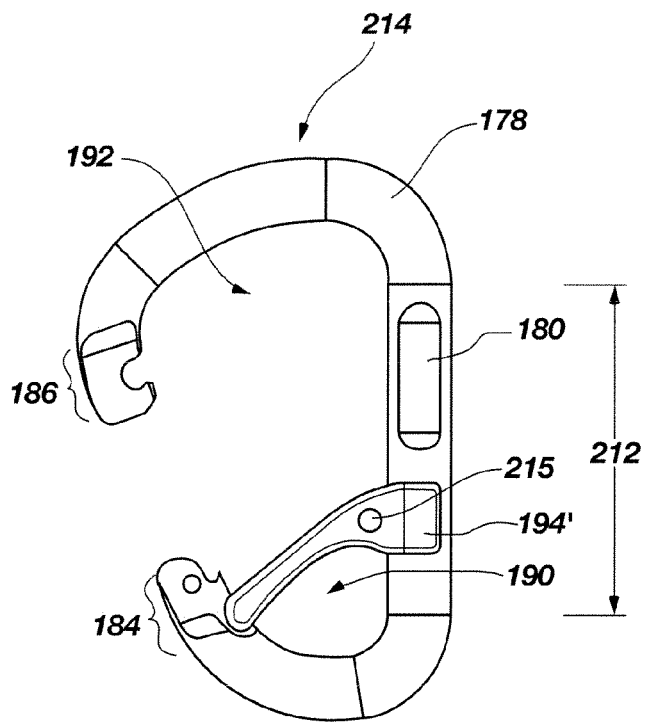
FIG. 7 illustrates another carabiner of the present invention having a fixed lateral support member.

Another exemplary embodiment of the present invention is shown in FIG. 7. A carabiner 214 having a body 178 and a lateral support member 194' is shown in FIG. 7. Although the carabiner 214 is shown in FIG. 7 without a gate, it should be understood that a gate (e.g., a locking or non-locking gate) is to be attached to the end region 184 by a pin or other securing element enabling rotation thereof. The lateral support member 194' extends from the elongated section 212 of the body 178 to bear against the end region 184 just below the gate to define the captive eye opening 190 and the major opening 192. The lateral support member 194', being positioned to abut the end region 184 just below the gate, does not interfere with the opening of the gate. The gate is, thus, capable of opening to its full extent with lateral support member 194' in place. As with the exemplary embodiment depicted in FIGS. 6A-6H, the lateral support member 194' has a female recess 210 (not shown in FIG. 7) that receives the end region 184. However, unlike the exemplary embodiments depicted in FIGS. 6A-6H, the lateral support member 194' is fixed in place by a securing element 215, such as a flat head screw, a rivet, pin, etc., that bears against the elongated section 212. Alternatively, lateral support member 194' may be formed in two mating halves and clamped about the elongated section 212 using the securing element 215. The lateral support member 194' may be manufactured and installed on the body 178 using one of the methods and materials employed in the embodiments shown in FIGS. 6A-6H.

The carabiner 214 depicted in FIG. 7 is well suited for use in an indoor climbing gym. Because the lateral support member 194' is fixed by the securing element 215, such that removal of it requires deliberately removing the securing element 215, if a sling or runner having another carabiner are looped through the captive eye opening 190 (i.e., as with a quickdraw), it is difficult to remove. Thus, it is difficult for a person to steal the other climbing gear looped through the captive eye opening 190 of the carabiner 214. Equipment manufacturers may also sell the carabiner 214 having a sling or lanyard looped through the captive eye opening 190. When the sling or lanyard wears out, the user may simply remove the lateral support member 194' and replace the sling or lanyard. A user may also keep the carabiner 214 semi-permanently attached to the belay loop of his or her climbing harness. When the harness wears out, the carabiner 214 may be removed and placed on a new harness.

Figure 8A:
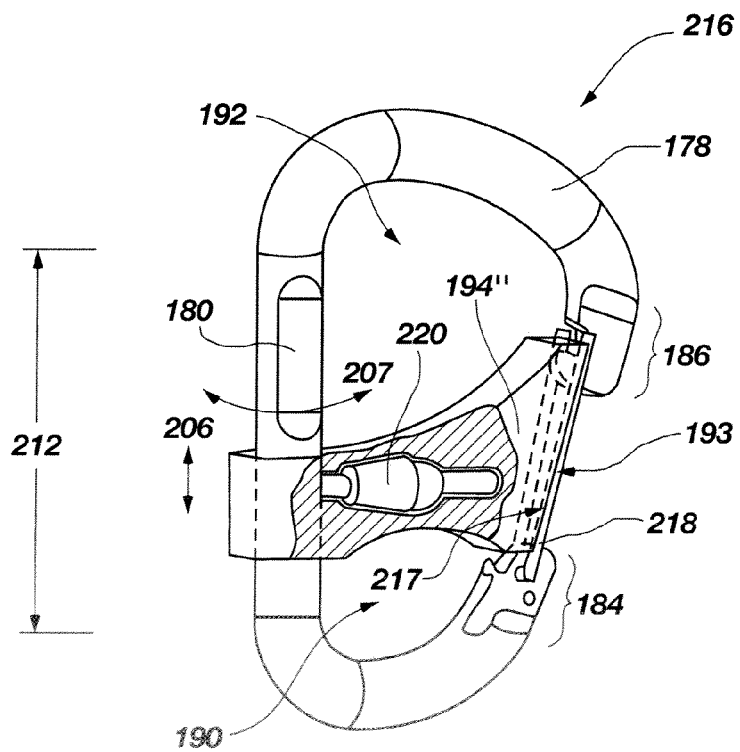
FIGS. 8A and 8B illustrate another exemplary carabiner of the present invention having a lateral support member that prevents opening of the gate.
Figure 8B:
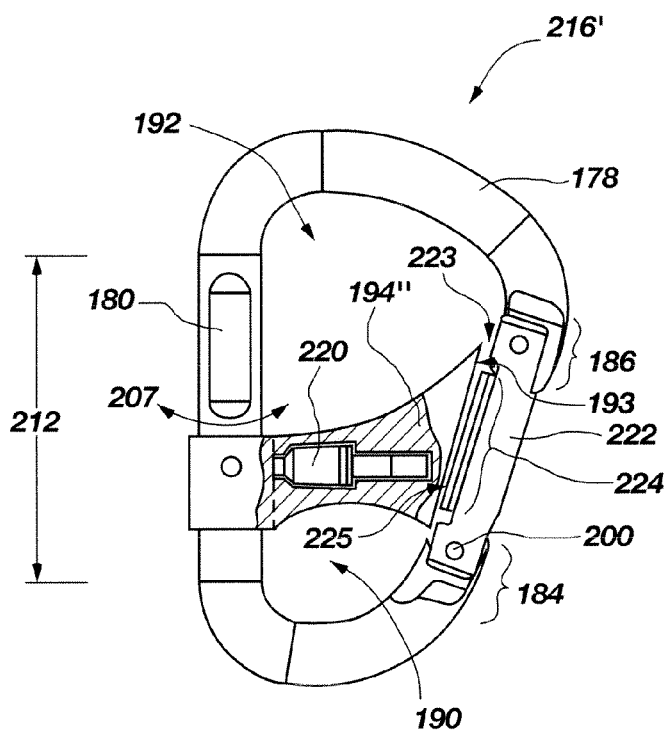

Another exemplary embodiment of the present invention is shown in FIGS. 8A and 8B. Referring to FIG. 8A, carabiner 216 having a body 178 comprising a lateral support member 194" and a wire gate 218 is shown. The lateral support member 194" may be fitted onto the elongated section 212 of the body 178 by a generally C-shaped channel of the lateral support member 194" receiving the elongated section 212 in a similar manner as the aforementioned exemplary embodiments of FIGS. 6A-6H and FIG. 7. The lateral support member 194" may be formed from a material such as, for example, a machined aluminum alloy, a plastic (e.g., injection molded nylon), or a composite (e.g., injection molded fiber reinforced plastic). In the closed position shown in FIG. 8A, the lateral support member 194" extends from the elongated section 212 of the body 178 laterally across to cover the wire gate 218 along a substantial portion of its length and to define the captive eye opening 190 and the major opening 192. A surface 193 of the lateral support member 194" lies proximate an interior portion 217 of the wire gate 218. The lateral support member 194" does not need to abut against the wire gate 218. Instead, there may be a small standoff between the lateral support member 194" and the wire gate 218. However, the lateral support member 194" is situated close enough to the wire gate 218 to prevent wire gate 218 from opening.

With continued reference to FIG. 8A, the lateral support member 194" is rotatable about the elongated section 212 in a direction 207 and movable to a certain extent along the elongated section 212 in an axial direction 206. A biasing mechanism 220 is depicted, such as a pin urged against the elongated section 212 by a spring, to bear against the elongated section 212 to restrain the lateral support member 194" from being able to rotate or move along the length of the elongated section 212. To rotate the lateral support member 194", the biasing mechanism 220 is manually released so it does not bear against the elongated section 212, enabling the user to manually rotate it in the direction 207. Once the lateral support member 194" is rotated, the wire gate 218 may be opened.

FIG. 8B illustrates an exemplary embodiment similar to that of FIG. 8A. A carabiner 216' is illustrated having a more conventional circular cross-section gate 222, instead of a wire gate 218, pivotably fixed by pin 200 at the end region 184 of the body 178. The cross-section gate 222 may have a flat portion 224 that opposes the lateral support member 194". The surface 193 of the lateral support member 194" lies proximate an interior portion 225 of the cross-section gate 222. The standoff 223, or space, between the lateral support member 194" and the cross-section gate 222 is shown in FIG. 8B. The lateral support member 194" functions in the same manner as described with respect to FIG. 8A. The lateral support member 194" may be installed using one of the many manufacturing and installation methods mentioned with respect to the embodiments of FIGS. 6A-6H and FIG. 7.

The carabiners 216 and 216' do not require a separate manual operation by the user to lock the gate. The lateral support member 194" must simply be rotated into the closed position shown in FIGS. 8A and 8B for the gate to be locked. Thus, a locking mechanism, such as a sleeve or the like, is not necessary for the gate. Without a locking mechanism, the gate may have a larger gate opening. Alternatively, the carabiners 216 and 216' may include a locking mechanism such as a sleeve for redundancy, which may be desirable. Because the lateral support member 194" covers a substantial portion of the length of the gate, it is nearly impossible for a rappel device, such as a figure eight device, to bear directly against the gate to cause failure. Furthermore, with respect to the carabiner 216 shown in FIG. 8A, it has the added benefit of employing a light weight wire gate 218 with a wider gate opening in conjunction with the lateral support member 194" to create the beneficial captive eye opening 190.

Figure 9A:
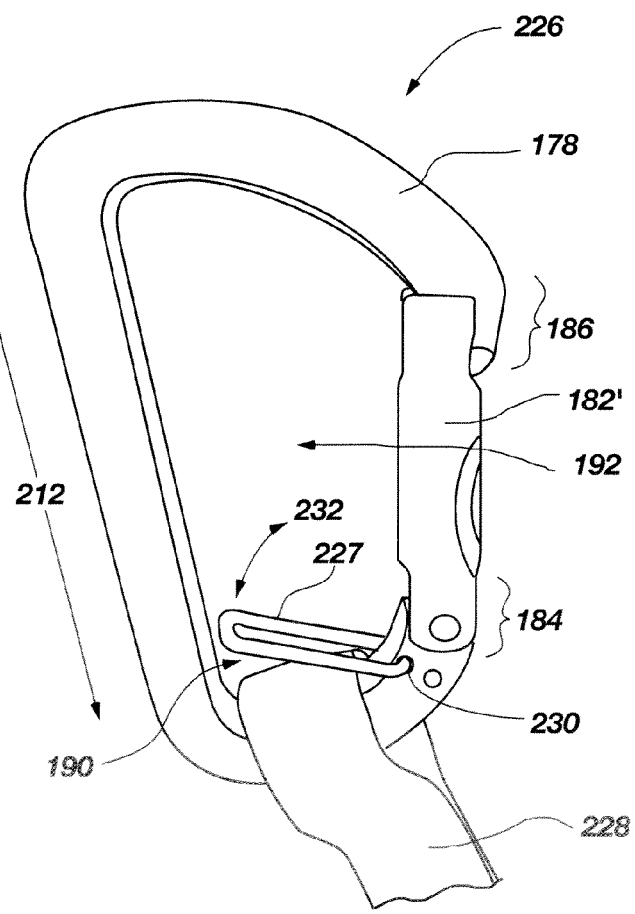
FIGS. 9A and 9B illustrate yet another exemplary carabiner of the present invention having a captive eye forming member that defines a captive eye opening with the body of the carabiner.
Figure 9B:
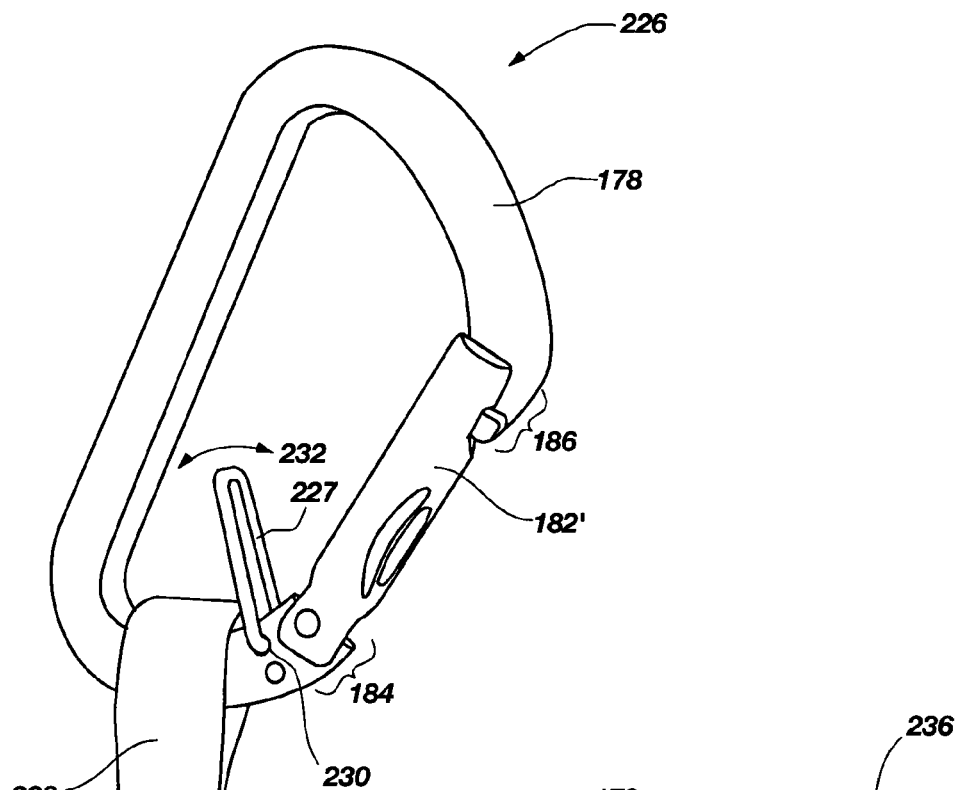

Yet another exemplary embodiment of the present invention is disclosed in FIGS. 9A and 9B. In FIG. 9A, a carabiner 226 having a body 178, a gate 182' pivotably attached to the end region 184, and a captive eye forming member 227 is shown. Although FIGS. 9A and 9B depict a non-locking gate 182', a locking gate may be employed if desired for the particular application. The captive eye forming member 227 shown in FIGS. 9A and 9B, is a wire that is bent to define a hollow rectangular shape, wherein its ends are attached to recesses 230 on the end region 184 of the body 178. The captive eye forming member 227 is manually rotatable along an arc in the direction 232. In FIG. 9B, the captive eye forming member 227 is shown in its open position. When in the closed position, as depicted in FIG. 9A, the captive eye forming member 227 and the body 178 define a captive eye opening 190 and a major opening 192. The captive eye forming member 227 is manually rotatable toward the major opening 192 to reach the open position as shown in FIG. 9B.

The captive eye forming member 227 is not a structural member, in that it is not designed to increase the load carrying capacity of the carabiner 226. Instead, the captive eye forming member 227 forms the captive eye opening 190 so that objects, such as a sling or runner 228, may be looped therethrough. The captive eye forming member 227 keeps the runner 228 hanging vertically when the carabiner 226 is clipped into an anchor or other piece of rock protection gear. The carabiner 226 is ideally suited for "sport climbing," where the climber clips carabiner 226 into pre-placed bolts installed along the rock climbing route. The captive eye forming member 227 keeps the runner 228 hanging vertically to make clipping the climbing rope into another carabiner attached to the runner 228 easier for the climber. Although the captive eye forming member 227 is shown in FIGS. 9A and 9B being formed from a wire, it may be formed to have other types of geometries as long as it forms the captive eye opening 190 and does not substantially interfere with the opening of the gate 182'. Additionally, the captive eye forming member 227 may be curved as it extends from the end region 184 of the body 178 to the elongated section 212 of the body 178. A curved captive eye forming member 227 may form a captive eye opening 190 of a greater or lesser dimension, and may more securely engage the runner 228 with less chance of unintentionally rotating open.

Figure 9C:
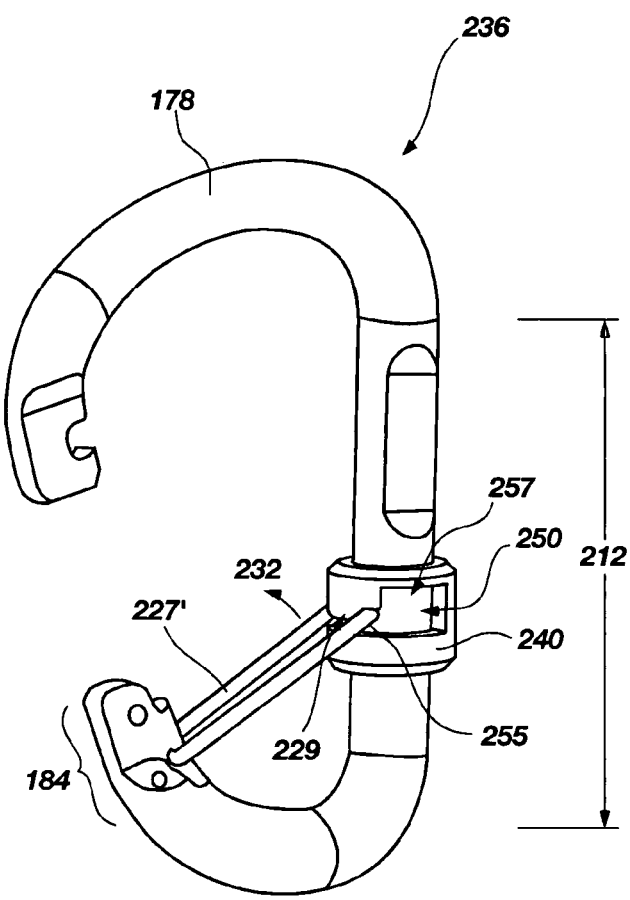
FIG. 9C illustrates an exemplary carabiner of the present invention having a captive eye forming member and a captive eye locking mechanism.

Still another exemplary embodiment of the present invention is disclosed in FIG. 9C. A carabiner 236 having a body 178, a captive eye forming member 227', and a captive eye locking mechanism 240 is shown. The captive eye forming member 227', shown in a closed, locked position, is attached to the end region 184 of the body 178 and manually rotatable thereabout along an arc in direction 232. The captive eye locking mechanism 240 may be fitted onto the elongated section 212 of the body 178 by a generally C-shaped channel receiving the elongated section 212 in a similar manner as the aforementioned exemplary embodiments of FIGS. 6A-6H and FIG. 7. Alternatively, the captive eye locking mechanism 240 may encircle the elongated section 212 of the body 178. The captive eye locking mechanism 240 includes an opening 250 configured for receiving the captive eye forming member 227'. The opening 250 comprises a restricted portion 255, configured to engage a distal end 229 of the captive eye forming member 227' therewithin and prevent rotation thereof. The opening 250 further comprises a non-restrictive portion 257, configured to enable the captive eye forming member 227' to rotate between an open and a closed position. The captive eye locking mechanism 240 may be twisted about the elongated section 212 of the body 178 between a locking position, with the distal end 229 of the captive eye forming member 227' engaged within the restricted portion 255 as shown, and an unlocking position, with the non-restrictive portion 257 of the opening 250 housing the distal end 229 of the captive eye forming member 227', enabling rotation thereof.

Figure 10A:
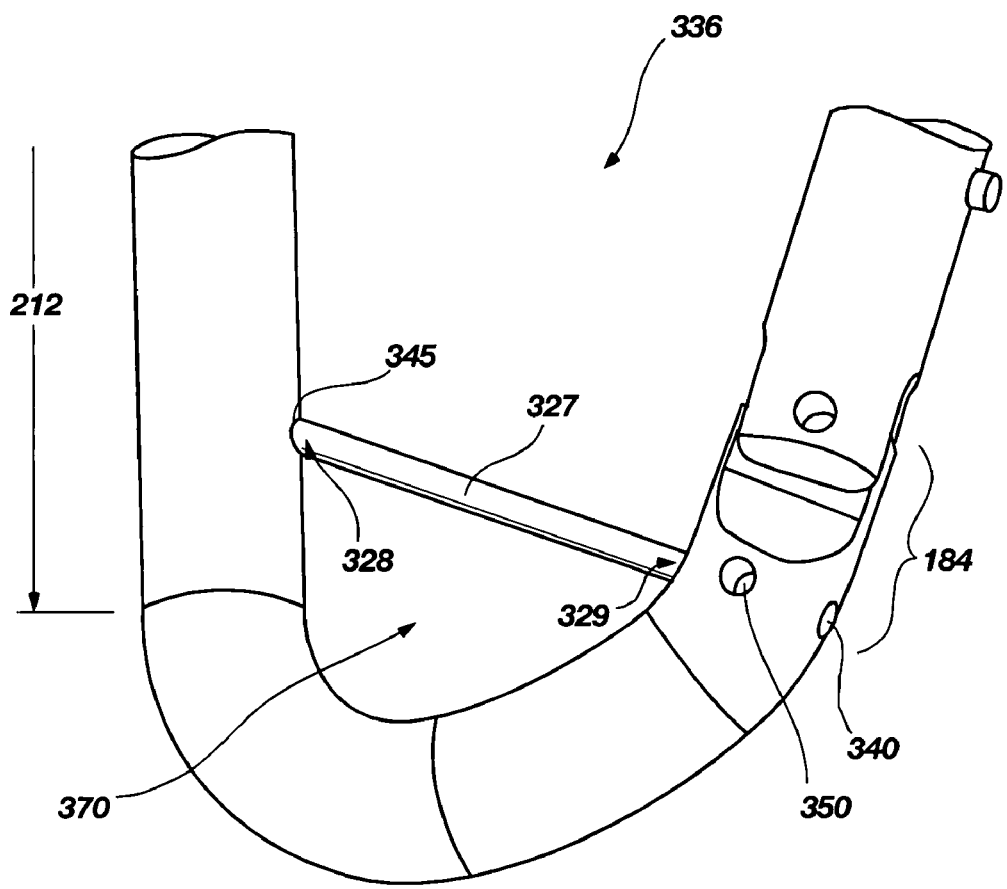
FIG. 10A illustrates yet another exemplary carabiner of the present invention having a captive eye forming member.
Figure 10B:
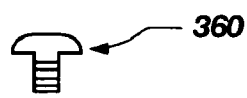
FIG. 10B illustrates a retaining mechanism for use with the carabiner of FIG. 10A.

Yet another exemplary embodiment of the present invention is disclosed in FIG. 10A. A portion of a carabiner 336 having a body 178 and a captive eye forming member 327 is shown. The captive eye forming member 327 comprises an elongated member, such as a pin. The illustrated captive eye forming member 327 has a round cross-section, however a cross-section of any shape, such as triangular or square, is within the scope of the invention. A first distal end 328 of the captive eye forming member 327 may be secured within a cavity 345 of the elongated section 212 of the carabiner body 178. A second distal end 329 of the captive eye forming member 327 may be housed within an access aperture 340 through the end region 184 of the carabiner body 178. The captive eye forming member 327 may be inserted through the access aperture 340 to form a captive eye opening 370. The captive eye forming member 327 may additionally be removed through the access aperture 340. The end region 184 of the carabiner body 178 may include a retaining aperture 350, positioned approximately orthogonal to the access aperture 340. A retaining mechanism, such as a screw, or setscrew 360 (FIG. 10B) may be placed within the retaining aperture 350 to engage the second distal end 329 of the captive eye forming member 327 and prevent removal thereof. The setscrew 360 may be loosened or detached to allow the captive eye forming member 327 to be removed. The captive eye forming member 327 may thus be reusable.

Alternatively, the access aperture 340 may be at least partially threaded, and a retaining mechanism such as the screw or setscrew 360 may be received therein, thereby retaining the captive eye forming member 327. The retaining aperture 350 is not required with a threaded access aperture 340. The captive eye forming member 327 described hereinabove may be a simple, unthreaded pin, which may be inexpensive and reusable. In yet another alternative, the captive eye forming member 327 may include threads on the second distal end 329 thereof. The captive eye forming member 327 may be twisted to engage the threaded access aperture 340, retaining the captive eye forming member 327 therewithin. The captive eye forming member 327 may be twisted in the opposite direction for removal. The captive eye forming member 327 may be manually twisted by gripping a central portion thereof, which may include a textured surface, or detents for easier handling. The second distal end 329 of the captive eye forming member 327 may include a slot or other engagement feature, enabling a simple tool, such as a screwdriver or hex wrench to be employed in twisting the captive eye forming member 327 for insertion or removal thereof.

Although the foregoing description contains many specifics, these are not to be construed as limiting the scope of the present invention, but merely as providing certain exemplary embodiments. Similarly, other embodiments of the invention may be devised which do not depart from the spirit or scope of the present invention. For example, captive eye forming members which extend from the elongated section of the body to the first end region, adjacent the nose, of the body of the carabiner are within the scope of the invention. The scope of the invention is, therefore, indicated and limited only by the appended claims and their legal equivalents, rather than by the foregoing description. All additions, deletions, and modifications to the invention, as disclosed herein, which fall within the meaning and scope of the claims are encompassed by the present invention.

What is claimed is:

1. A carabiner comprising:
   a generally C-shaped body having a first end region, a second end region, and an elongated section therebetween;
   a gate mounted at the second end region and being pivotable between a closed position and an open position;
   an arm rotatable about the elongated section between a first rotational position and at least a second rotational position; and
   a manually operable biasing element that is configured to prevent the arm from unintentionally rotating from the first rotational position toward the second rotational position;
   wherein in the first rotational position the arm extends laterally from the elongated section to at least proximate an interior portion of the gate opposing the elongated section, the arm not being attached to the gate in the first rotational position.

2. The carabiner of claim 1, further comprising a standoff between the surface of the arm and the interior portion of the gate and an opposing surface of the arm in the first rotational position.

3. The carabiner of claim 1, wherein a surface of the arm opposing the interior portion of the gate is substantially coextensive along a length of the gate.

4. The carabiner of claim 1, wherein the manually operable biasing element includes a pin biased by a spring.

5. The carabiner of claim 1, wherein the gate is a wire gate.

6. The carabiner of claim 1, wherein the gate has a substantially circular cross-section.

7. The carabiner of claim 6, wherein the gate further comprises an at least substantially flat portion configured to oppose a surface of the arm proximate the gate.

8. The carabiner of claim 1, wherein the gate of the carabiner does not include a locking sleeve.

9. The carabiner of claim 1, further comprising a locking sleeve mounted on the gate and movable between an unlocked position and a locked position, the locking sleeve engaging the first end region of the elongated section of the generally C-shaped body and preventing movement of the gate from the closed position to the open position when the gate is in the closed position and the locking sleeve is in the locked position.

10. The carabiner of claim 1, wherein the manually operable biasing element is configured to bear against the elongated section of the generally C-shaped body.

11. The carabiner of claim 1, wherein the manually operable biasing element is located on the arm.

12. The carabiner of claim 1, wherein the arm is at least substantially comprised of an aluminum alloy.

13. The carabiner of claim 1, wherein the arm comprises fiber reinforced plastic.

14. A carabiner comprising:
    a generally C-shaped body having a first end region, a second end region, and an elongated section therebetween;
    a gate mounted at the second end region and being pivotable between a closed position and an open position;
    a lateral support member rotatable about the elongated section between a first rotational position and at least a second rotational position, the lateral support member extending from the elongated section to a location at least proximate the gate when the lateral support member is in the first rotational position; and
    a manually operable biasing element configured to bear against the elongated section of the generally C-shaped body and maintain the lateral support member in the first rotational position when the lateral support member is positioned in the first rotational position.

15. The carabiner of claim 14, wherein the manually operable biasing element is located on the lateral support member.

16. The carabiner of claim 14, wherein the gate of the carabiner does not include a locking sleeve.

17. The carabiner of claim 14, wherein the lateral support member is rotatable into the first rotational position from both a first side and a second side of the carabiner.

18. A carabiner comprising:
    a generally C-shaped body having a first end region, a second end region, and an elongated section therebetween, the generally C-shaped body defining an interior region of the carabiner;
    a gate mounted at the second end region and being pivotable between a closed position and an open position; and
    a lateral support member rotatable about the elongated section of the generally C-shaped body through the interior region of the carabiner; and
    at least one element configured to maintain the lateral support member in a closed position when the lateral support member is positioned in the closed position, the lateral support member extending from the elongated section of the generally C-shaped body to a location at least proximate the gate when the lateral support member is in the closed position.

19. The carabiner of claim 18, wherein the at least one element comprises a manually operable biasing element configured to bear against the elongated section of the generally C-shaped body.

* * * * *